B. J. HICKMAN.
HORSE COLLAR ADJUSTER.
APPLICATION FILED AUG. 9, 1910.
991,618.
Patented May 9, 1911.
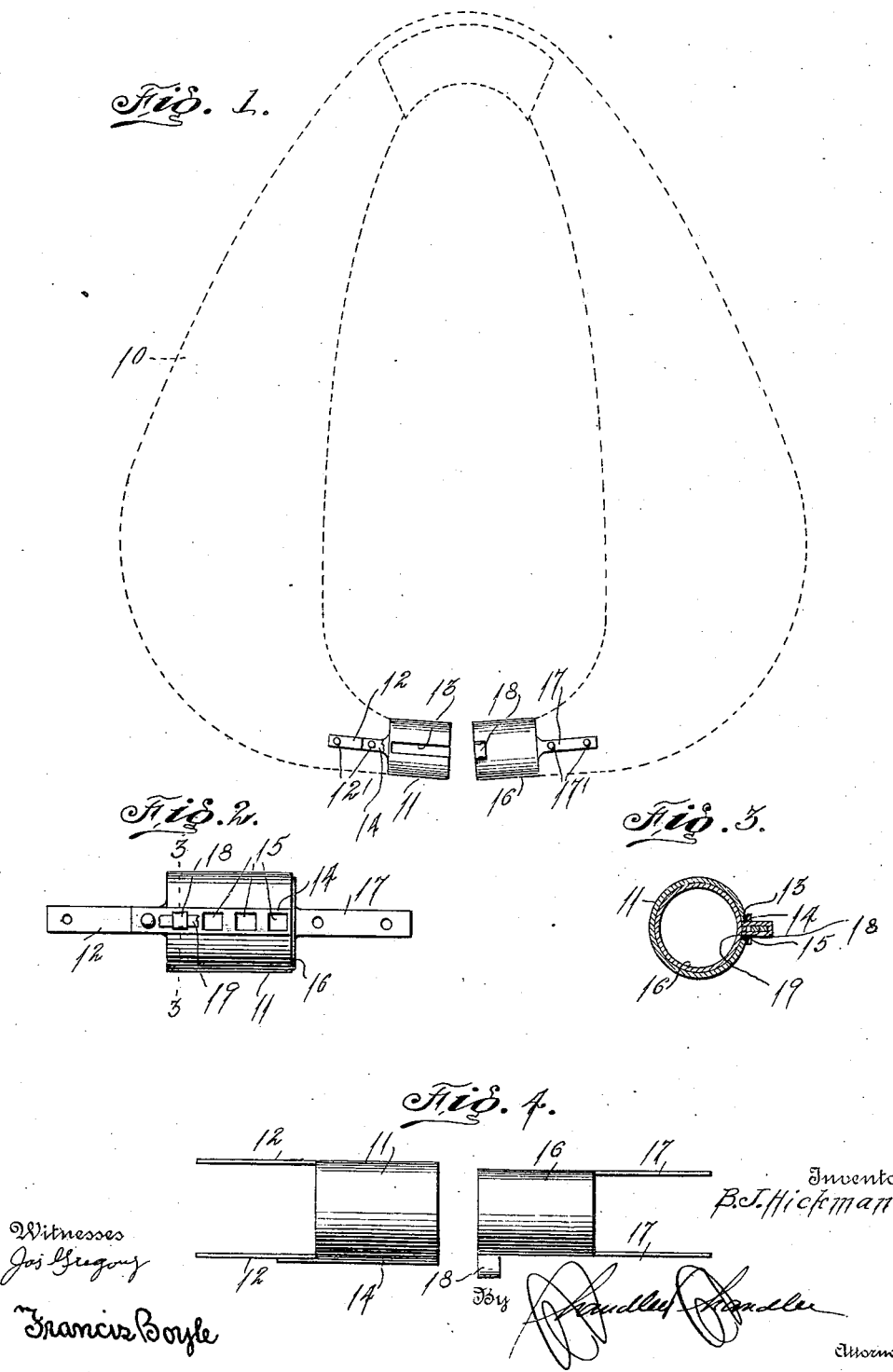

UNITED STATES PATENT OFFICE.

BURTIS J. HICKMAN, OF ANSLEY, NEBRASKA.

HORSE-COLLAR ADJUSTER.

991,618.  Specification of Letters Patent.  Patented May 9, 1911.

Application filed August 9, 1910. Serial No. 576,331.

*To all whom it may concern:*

Be it known that I, BURTIS J. HICKMAN, a citizen of the United States, residing at Ansley, in the county of Custer, State of Nebraska, have invented certain new and useful Improvements in Horse-Collar Adjusters; and I do hereby declare the following to be a full, clear, and exact description of the invention, such as will enable others skilled in the art to which it appertains to make and use the same.

This invention relates to horse collar fasteners, particularly to means for adjustably securing together the ends of open-throat horse collars.

The object of the present invention is to provide a means for fastening together the meeting ends of an open-throat collar that will permit of the collar being adjusted to fit small or large draft animals without irritation to the neck of the animal.

A further object is to provide a device of this character that will be formed of telescoping members of such cross dimension as to form a continuation of the outer surface of the collar so that the animal's neck will not be pinched or otherwise uncomfortably held.

In the accompanying drawing forming part of this specification:—Figure 1 is a side elevation, with parts broken away, of my improved device applied to an open-throat horse collar, with the latter in dotted lines. Fig. 2 is a side elevation of the device with the parts telescoped. Fig. 3 is a cross sectional view taken on the line 3—3, Fig. 2. Fig. 4 is a top plan view of the device with the parts open.

Referring now to the drawing, the numeral 10 designates an open-throat horse collar of ordinary construction. Fixed to one end of the collar is a tubular sleeve 11, one circular end of which is open and the opposite end of which is closed and is provided with spurs 12, which are adapted to be slid upon the material of the collar and riveted or otherwise rigidly secured to the collar as shown at 12'. This sleeve is provided with a longitudinal slot 13 and is further provided with a spring leaf 14 which overlies this slot and is approximately the same in length thereas. This leaf is provided with a series of transverse openings 15, the purpose of which will presently appear.

Arranged upon the mating end of the collar is a sleeve 16, which is sufficient in size to telescope into the above described sleeve 11, and is open at one end and closed at the opposite end, the closed end of the sleeve being provided with spurs 17 which are slid upon the material of the collar and riveted or otherwise secured thereto as shown at 17'. Projecting laterally from one side of the sleeve adjacent its open end is an eye 18, this eye being adapted to enter the longitudinal slot of the mating sleeve 11 when the parts are in telescoped position. This eye is further adapted to receive the hame strap 19, which secures the collar to the hames. The leaf above described when in closed position engages the eye 18 below the hame strap 19 so that the latter locks the leaf against accidental opening.

It will be noted that the telescoping sleeves are sufficient in cross dimension to present their outer surfaces flush with the outer surfaces of the meeting ends of the collar so that no crevices or other mutilations will be presented in the collar to render the collar uncomfortable to the animal. The locking leaf and locking eye above described, it will be noted, are arranged upon the outer side of the device so as to be held away from the animal's neck. It will be readily understood that by engaging the eye through any particular opening of the locking leaf, the members will be adjustably locked together so that the collar may readily be fitted to small or large draft animals.

What is claimed is:—

1. An open-throat collar fastener comprising a pair of telescoping members, one of which is provided with a longitudinal slot, and the other with a locking element adapted to enter said slot, and a locking leaf upon one of said members having a series of openings engageable with said locking element for adjustably locking the members together.

2. An open-throat collar fastener comprising a pair of telescoping members, one of which is provided with a longitudinal slot, and the other with an outstanding hame strap receiving eye adapted to enter said slot, and a locking leaf upon one of said members having a series of openings engageable with said eye for adjustably locking the members together, said leaf being held closed by a hame strap engaged through said eye.

In testimony whereof, I affix my signature, in presence of two witnesses.

BURTIS J. HICKMAN.

Witnesses:
W. E. RAMA,
GROVER A. HOHMAN.